May 16, 1950     B. W. BENBOW     2,508,091
ELECTRICAL TROLLEY CABLE APPARATUS
Filed Dec. 26, 1944
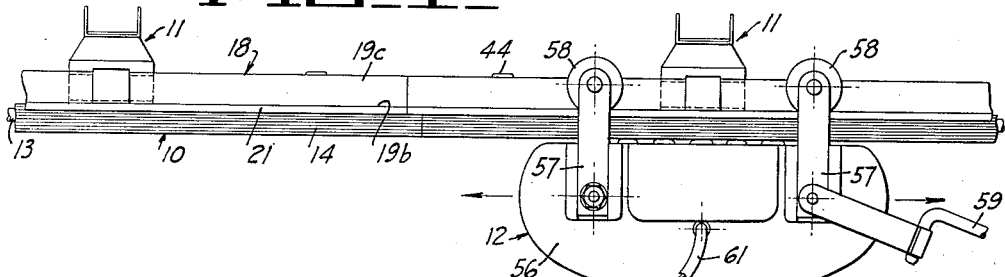
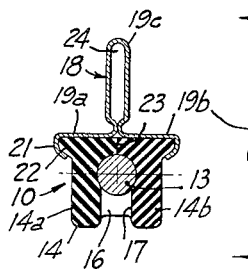
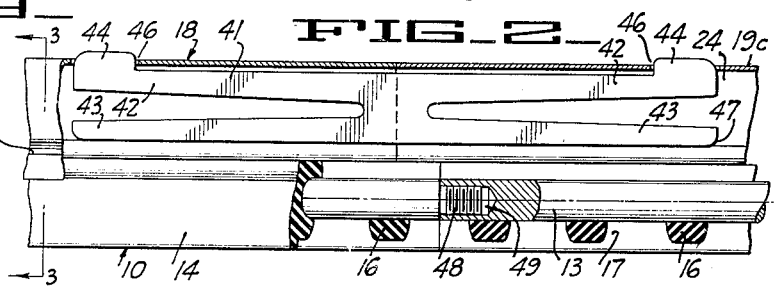
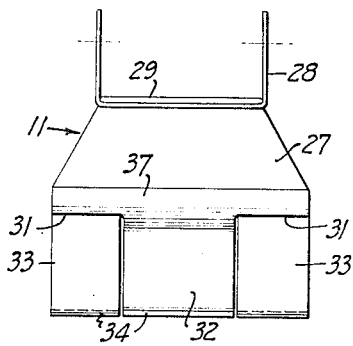
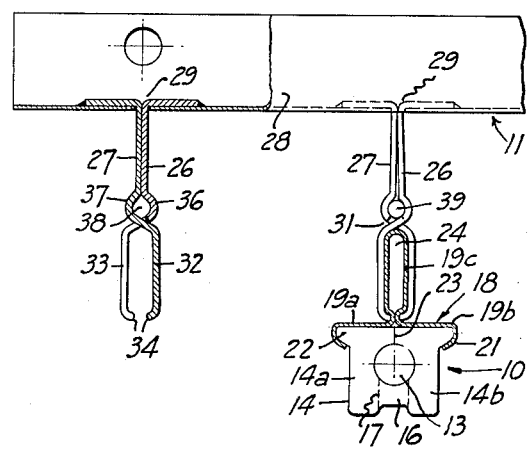
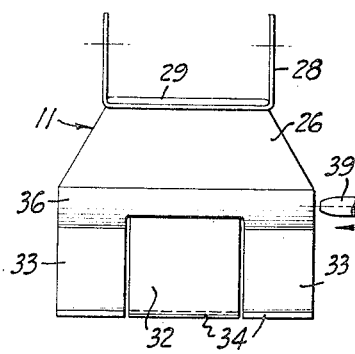
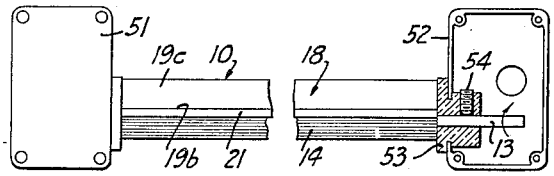
INVENTOR.
Burtis W. Benbow
BY Paul D. Flehr
ATTORNEY Patented May 16, 1950

2,508,091

UNITED STATES PATENT OFFICE 2,508,091

ELECTRICAL TROLLEY CABLE APPARATUS

Burtis W. Benbow, Benbow, Calif.

Application December 26, 1944, Serial No. 569,784

4 Claims. (Cl. 191—23)

This invention relates generally to electrical trolley cable apparatus of the type suitable for use with various movable appliances such as hoists, cranes, small electrical locomotives, or the like.

In apparatus of the above type it is common practice to utilize extended cable conductors of suitable size and supported at intervals by suitable insulators. In the majority of installations the cables are bare and therefore workmen are exposed to the hazards of accidental contact. It has been proposed to protect the conductors against accidental contact by the use of insulating shrouding, with the shrouding formed in such a manner as to permit continuous electrical contact. A shrouded conductor of this type is disclosed for example in my Patent No. 2,255,874. Certain problems are encountered in the construction and installation of such equipment, including particularly the supporting of the conductor without sag and the provision of features to facilitate utilization with traveling trolley or contacting devices.

It is an object of the present invention to provide a cable conductor assembly of the type having a shroud of insulating material and which has novel means forming a trackway for a traveling contactor device, together with means for attaching the assembly to a fixed support.

A further object of the invention is to provide apparatus of the above character having novel means for releasably attaching the shrouded cable assembly to convenient fixed supports, and which will facilitate installation of the apparatus or the removal of sections for replacement or repair.

Another object of the invention is to provide novel means for coupling together sections of a shrouded trolley cable assembly.

A further object of the invention is to provide a shrouded cable assembly having threaded connections between conductor sections, together with means whereby these connections are maintained tight at all times.

Further objects of the invention will appear from the following description in which the preferred embodiment has been set forth in detail in conjunction with the accompanying drawing.

Referring to the drawing—

Fig. 1 is a side elevational view illustrating apparatus in accordance with the present invention and being utilized in conjunction with a traveling contacting device.

Fig. 2 is an enlarged side elevational view of the cable assembly, with a portion of the same in cross section.

Fig. 3 is a cross sectional view taken along the line 3—3 of Figure 2.

Fig. 4 is a detail illustrating one of the gripping devices utilized in the assembly of Fig. 1.

Fig. 5 shows the same device as Fig. 4, but looking at the reverse side.

Fig. 6 is an enlarged view looking toward the end of Fig. 4, and partly in cross section.

Fig. 7 is a side elevational view illustrating the terminal boxes at the ends of the cable assembly, and means in conjunction with the boxes for applying torsional tension to the cable conductor.

The apparatus illustrated in Fig. 1 consists generally of a cable conductor assembly designated generally at 10, suspended from suitable supporting means by the gripping devices 11, and being utilized in conjunction with a traveling contactor device 12. Device 12 can be of the type disclosed in my Patent No. 2,255,874 granted September 16, 1941.

The assembly 10 preferably includes (Fig. 3) an extended cable conductor 13 made of suitable material such as hardened copper, and of suitable diameter for the current carrying capacity desired. About the cable conductor 13 there is a shroud 14 formed of suitable insulating material, preferably resilient material such as molded natural or synthetic rubber. While the specific form of the shroud may vary, in this instance it includes side portions 14a and 14b, which are joined below the conductor 13 by the teeth-like bars 16. It is desirable that the conductor 13 have a comparatively loose fit within the shroud, as distinguished from a bond between the metal and the rubber. This enables insertion or removal of lengths of the conductor from the shroud, after the shroud has been assembled with the backing to be presently described. Between the teeth-like bars 16 there are open recesses or cavities 17, through which the surface of the conductor 13 is accessible for electrical connection.

Attached to the back or upper side of the shroud 14 there is a relatively rigid mounting designated generally at 18. This mounting is formed in such a manner as to provide the parallel and unobstructed trackways 19a and 19b, extending longitudinally of the conductor 13. Intermediate these trackways there is a rib-like portion 19c which stiffens the assembly, and which is utilized for engagement with the gripping devices 11.

It is desirable to make the entire mounting 18 from a strip of suitable sheet metal which is bent upon itself to the general T-shaped form shown in Figure 3. After bending the strip to the general form illustrated, the edge portions 21 are finally crimped over the raised ridges 22 of the shroud, in order to form a secure clamping engagement. It will be noted in this instance that the upper side of the shroud above the conductor 13 is longitudinally slit as indicated at 23 in order to enable introduction of the conductor 13. Because of the clamping effect of crimped edges 21, the adjacent surfaces along the slit are pressed tightly together.

The doubling of the sheet metal to form the rib portion 19c is such that a relatively narrow longitudinal channel 24 is formed. As will be presently explained this channel is desirable in conjunction with the means for coupling together adjacent sections.

Each of the gripping devices 11 (Figs. 4 to 6) utilize tongues which extend alongside the rib 19c, and they are constructed whereby a removable locking pin can be inserted to insure tight clamping engagement. Thus each device is made of a pair of flat sheet metal strips 26 and 27, having their upper portions suitably secured together and attached to a suitable mounting member 28. It will be evident that member 28 can vary to suit different requirements, but in this instance it is in the form of a pressed metal channel. The web of the channel is slotted to receive the upper ends of strips 26 and 27, and above the web the strips are bent over as indicated at 29 and welded or otherwise suitably secured to the web. The lower end of strip 27 terminates along the lines 31, except for an intermediate portion which is extended to form the tongue 32. Strip 26 is cut away to accommodate the tongue 32, and it has two lower portions 33 forming spaced tongues upon the opposite sides of the tongue 32. All of these tongues 31, 32 have lower inturned edges 34 to engage at the base of the rib 19c. Immediately above the tongues 31, 32 the strips 26, 27 are made slightly concave as indicated at 36, 37, to form a recess 38 capable of receiving the locking pin 39. Before the locking pin can be conveniently inserted the tongues 32, 33 must be pressed upon (opposite sides of the rib 19c, after which the locking pin can be inserted to retain the tongues in gripping engagement with the sides of the rib.

When it is desired to remove a conductor assembly from a particular device 11 it is only necessary to remove the locking pin, after which the tongues 32, 33 are permitted to spring outwardly when one applies reasonable downward force upon the assembly 10. It will be noted that normally tongues 32 and 33 are sufficiently close together that when the rib 19c is inserted between the same, there is sufficient retention due to the resilient character of the tongue to temporarily support the conductor assembly. This is a desirable feature in that it facilitates making installations. After sections of the assembly 10 have been temporarily suspended in this manner, then the locking pins can be applied to provide a permanent grip.

It will be evident that in an actual installation the number of assemblies 10 supported in juxtaposition to each other will depend upon particular requirements. In a typical installation two or three such conductor assemblies are supported side by side from common supporting members 28, and these members in turn are suitably attached to structural members of the building in which the installation is being made.

In practice it is desirable to make the assembly 10 in sections of standardized lengths, so that for a given installation a sufficient number of these sections will be connected together to form a continuous assembly of the length desired. Fig. 2 illustrates a convenient and novel type of coupling means for connecting together adjacent sections. Thus a flat metal strip 41 is provided, dimensioned to fit within the channel 24. The end portions of this strip are bifurcated or forked, to provide upper and lower branches or legs 42, 43 of considerable resiliency. The upper branches 43 have projecting lugs 44 which normally occupy slots 46 provided in the upper edge of the rib 19c. The lower branches 43 have rounded corners 47 to facilitate insertion into the channel 24.

The coupling member 41 is utilized as follows: One end portion is first inserted into the channel 24 of a section to be connected, by springing the branches 42, 43 together. When it has been inserted sufficiently far lug 44 engages within the slot 46. Then the projecting end of member 41 is inserted in the other section in the same manner, whereby the two sections finally occupy the position shown in Fig. 2.

It is also desirable to construct the cable conductor 13 in sections of convenient standardized lengths. These sections are then preferably threaded together as shown in Fig. 2. Thus one end of a section can be provided with a male stud 48 threaded for engagement with an internally threaded opening 49, provided in the end of an adjacent conductor section.

When a number of such cable conductor sections are utilized, with threaded engagement between the same, it is important that the threaded connections be maintained tight. For this purpose I provide means whereby the entire length of cable conductor is maintained under torsional tension. As shown in Fig. 7 the ends of the conductor are associated with the metal terminal boxes 51, 52, which facilitate making the necessary electrical connections. The cable conductor projects considerably beyond the shroud 14 and extends through a suitable insulating block 53 into the interior of the adjacent box. A set screw 54 is threaded into block 53 to grip and retain the conductor in any desired angular position. Upon completing an assembly set screw 54 is clamped upon one end of the cable conductor, as for example within the box 51. In the other box the projecting end of the conductor 13 is turned in a direction to tighten all of the threaded connections, and in order to apply torsional strain to the conductor within its elastic limit. The adjacent set screw 54 is then tightened to hold the entire length of conductor under such torsional tension. The torsional strain is transmitted throughout the length of the conductor because of the fact that the conductor is not bonded to the surrounding shroud.

The traveling contacting device 12 is illustrated only generally, and need not be described in detail. Briefly it can consist of a housing 56 serving to enclose an articulated or endless chain type of contacting mechanism as disclosed in the aforesaid Patent 2,255,874. The conducting teeth of this mechanism are adapted to extend into recesses 17 to make electrical engagement with the cable conductor 13. Straps 57 extend upwardly from the sides of the housing 56, and at their upper ends they carry the tracking wheels 58. These wheels operate upon the parallel tracks 19a, 19b, and retain the device 12 in proper position for making good electrical contact. Element 59 represents a suitable towing device attached to the box 56, for moving the device from place to place, as for example in conjunction with operation of a hoist. A flexible electrical cable 61 includes conductors which complete a circuit to the cable conductor.

It is clear from the foregoing that I have provided an apparatus having great utility for a wide variety of services. Although the shrouding of the conductor is of relatively resilient material, the conductor and shrouding assembly is adequately supported without placing longitudinal tension upon the conductor and without appreciable sag. The supporting of the assembly 10 by way of the devices 11 greatly facilitates making initial installations, as well as to facilitate making changes, alterations, or repairs. The method of coupling illustrated in Fig. 2 likewise facilitates installations and changes, and the manner of connecting together the various lengths of the cable conductor makes for adequate current carrying capacity without heating at the points of connection between sections.

I claim:

1. In electrical trolley cable apparatus, an extended cable conductor, a shroud of insulating material disposed about the conductor, a metal backing attached to the insulating material, the metal backing being formed to provide a pair of spaced parallel trackways extending longitudinally of the conductor and also forming a rib disposed in a plane substantially at right angles to the general plane of the trackways and intermediate the same, the base of the rib being constricted to provide exterior longitudinal recesses, and means forming a supporting clip for engaging said rib, said clip comprising a plurality of sheet metal tongues adapted to engage upon opposite sides of the rib without obstructing said trackways, and portions of said tongues extending into said recesses.

2. In electrical trolley cable apparatus, an extended cable conductor, a shroud of insulating material disposed about the conductor, the shroud being in at least two lengthwise sections, a metal backing attached to the insulating material and likewise comprising two sections corresponding to the sections of the shroud, said backing being formed to provide a rib extending lengthwise of the conductor and formed hollow to provide an inner tunnel, the tunnel being spaced laterally from both the conductor and the shroud, and means extending within said tunnel for locking adjacent end sections together.

3. In electrical trolley cable apparatus, an extended cable conductor, a shroud of insulating material disposed about the conductor, the shroud being in at least two lengthwise sections, a metal backing attached to the insulating material and likewise comprising two sections corresponding to the sections of the shroud, said backing being formed to provide an upstanding and substantially flat rib extending lengthwise of the conductor and formed hollow to provide an inner tunnel which is closed on both its longitudinal edges, and means extending within said tunnel for locking adjacent end sections together, said last named means comprising a flat metal strip having forked end portions, and locking lugs on branches of the end portions adapted to engage in slots provided in the ribs.

4. In electrical trolley cable apparatus, an extended cable conductor formed in a plurality of sections, said sections having threaded connections, an insulating shroud surrounding the conductor, means for securing the shroud to a fixed support, terminal boxes at the ends of the conductor, and means at the terminal boxes for clamping the projecting end portions of the conductor and for retaining the entire length of the conductor under torsional tension, the torsional tension being in a direction to retain the threaded connections tight.

BURTIS W. BENBOW.

REFERENCES CITED

The following references are of record in the file of this patent:

UNITED STATES PATENTS

| Number | Name | Date |
|---|---|---|
| 453,095 | Vinton | May 26, 1891 |
| 457,105 | Boynton | Aug. 4, 1891 |
| 768,606 | Kubierschky | Aug. 30, 1904 |
| 1,466,893 | Dunbar | Sept. 4, 1923 |
| 1,819,885 | Frank | Aug. 18, 1931 |
| 1,914,467 | Stevens | June 20, 1933 |
| 2,128,135 | Glasgow | Aug. 23, 1938 |
| 2,156,827 | Wehr | May 2, 1939 |
| 2,227,625 | Benbow | Jan. 7, 1941 |
| 2,358,116 | Wehr | Sept. 12, 1944 |